United States Patent
Fujimasu

[15] 3,642,509
[45] Feb. 15, 1972

[54] HYDRAULIC COMPOSITION

[72] Inventor: Jiro Fujimasu, Tokyo, Japan
[73] Assignee: Fujimasu Industries International
[22] Filed: Aug. 14, 1969
[21] Appl. No.: 850,255

[52] U.S. Cl. ..................106/287 SS, 61/36, 106/97, 106/315
[51] Int. Cl. ..................................................C08h 17/88
[58] Field of Search ..................106/287, 120, 97; 61/36

[56] References Cited

UNITED STATES PATENTS

| | | | |
|---|---|---|---|
| 1,562,207 | 11/1925 | Croll | 160/102 |
| 2,390,225 | 12/1945 | Sherman | 106/100 |
| 2,792,312 | 5/1957 | Geary | 106/100 |
| 3,188,221 | 6/1965 | Matsuda et al. | 106/315 |
| 3,317,327 | 5/1967 | Matsuda et al. | 106/315 |

OTHER PUBLICATIONS

The Chemistry of Cement & Concrete "Lea & Desch" 1956, pp. 148, 252, 362, 367, 570 & 486, Chem Abstract 64: 4775 g

*Primary Examiner*—Theodore Morris
*Attorney*—Fulwider, Patton, Rieber, Lee & Utecht

[57] ABSTRACT

An hydraulic composition for setting or hardening soils comprising 100 parts by weight of a component A and 6 to 10 parts by weight of a component B. Component A is the product obtained by calcining a mixture of the following constituents: 100 parts by weight of limestone; 3 to 6 parts by weight of alumina; 15 to 30 parts by weight of silica; 4 to 10 parts by weight of magnesium oxide; 5 to 10 parts by weight of iron oxides; and 5 to 10 parts by weight of magnesium chloride. This mixture is preferably calcined at a temperature between about 1,000° and about 1,300° C. and is thereafter rapidly cooled to a temperature below about 100° C. The calcined granules so produced are pulverized and mixed with component B having the following preferred composition: 79 parts by weight of calcium sulphate; 55 to 75 parts by weight of an alkaline earth metal chloride; 5 to 10 parts by weight of an alkali metal silicofluoride; 10 to 20 parts by weight of an alkali metal carbonate; 10 to 20 parts by weight of a buffering agent; 30 to 50 parts by weight of lignin sulfonate.

A further improvement can be made by adding a component C to the mixture of components A and B. Component C has the following composition: 100 parts by weight of at least one member selected from the group consisting of weathered granite soil calcined at 700° to 900° C., decomposed basalt soil calcined at 300° to 500° C., and volcanic ashes or decomposed andesite soil calcined at 300° to 500° C.; and 40 to 60 parts by weight of at least one member selected from the group consisting of sand or pozzolan gravel calcined at 200° to 300° C., limestone residue which comprises overheated calcined residue which is not returned to slaked lime in the presence of water, calcined at 200° to 300° C., calcium hydroxide calcined at 200° to 300° C., nickel blast furnace slag calcined at 200° to 300° C., and the residue of electrolytic refining of aluminum calcined at 200° to 300° C. Component C is preferably employed in the range of about 10 parts by weight to about 20 parts by weight per 100 parts by weight of component A.

17 Claims, No Drawings

HYDRAULIC COMPOSITION

CROSS-REFERENCE TO RELATED APPLICATION

This application is based upon Japanese patent application Ser. No. 44-0 10772, filed Feb. 15, 1969.

BACKGROUND OF THE INVENTION

This invention relates to earth control and, more particularly, to stabilizing or solidifying earth.

Heretofore, various soil-setting or hardening agents, e.g., Portland cement, have been employed. However, in the absence of a general theory relating to the setting and hardening of soils, these presently employed soil-setting agents have been developed with respect to specific soils and soil conditions. Thus, although presently employed soil-setting agents may be partially satisfactory for setting and hardening some soils, they are ineffective for setting and hardening other soils.

In addition to the desirability of having a soil-setting agent which is useful in connection with a variety of soils and soil conditions, the soil-setting and hardening agent should produce, in combination with these soils, a product having, for example, high compression strength, rapid setting time, good dimensional stability, high crack, weather and wear resistance, and it should exhibit some elasticity. Heretofore, it has not been possible to provide a hydraulic soil-setting and hardening agent having the aforementioned desirable characteristics and which is inexpensive to produce. The latter is an important requisite because of the large amounts of soil-setting and hardening agents employed in each project.

SUMMARY OF THE INVENTION

The hydraulic composition of this invention is a composition which can be employed with a wide variety of soils. It basically comprises 100 parts by weight of a component A and 6 to 10 parts by weight of a component B.

Component A is the product obtained by calcining a mixture of the following constituents: limestone—100 parts by weight; alumina—3 to 6 parts by weight; silica—15 to 30 parts by weight; magnesium oxide—4 to 10 parts by weight; iron oxides—5 to 10 parts by weight; and magnesium chloride—5 to 10 parts by weight. This mixture is preferably calcined at a temperature between about 1,000° and about 1,300° C. and is thereafter rapidly cooled to a temperature below about 100° C. The calcined material so produced is preferably pulverized and mixed with component B having the following preferred composition: calcium sulfonate—79 parts by weight; an alkaline earth metal chloride, e.g., calcium chloride—55 to 75 parts by weight; an alkali metal silicofluoride—5 to 10 parts by weight; an alkali metal carbonate—10 to 20 parts by weight; a buffering agent, e.g., sodium tripolyphosphate—10 to 20 parts by weight; lignin sulfonate—30 to 50 parts by weight.

The resulting hydraulic composition is mixed with soil, compacted and sprinkled with water. The hydraulic composition-soil mixture is allowed to harden and, when hardened, may serve as a pavement for secondary roads or mountain paths or, it may be covered with concrete or asphalt to produce a major road.

The hydraulic composition obtained by combining components A and B, as described, may be improved by the addition thereto of a component C. The latter has the following composition: 100 parts by weight of at least one member selected from the group consisting of weathered granite soil calcined at 700° to 900° C., decomposed basalt soil calcined at 300° to 500° C., and volcanic ashes or decomposed andesite soil calcined at 300° to 500° C.; and 40 to 60 parts by weight of at least one member selected from the group consisting of sand or pozzolan gravel calcined at 200° to 300° C., limestone residue which comprises overheated calcined residue which is not returned to slaked lime in the presence of water, calcined at 200° to 300° C., calcium hydroxide calcined at 200° to 300° C., nickel blast furnace slag calcined at 200° to 300° C., and the residue of electrolytic refining of aluminum calcined at 200° to 300° C. Composition C is preferably used in the range of 10 to 20 parts by weight per 100 parts by weight of component A.

The hydraulic composition of this invention can be employed to set and harden soil in a wide range of applications including road and building construction projects. The hardened or cured hydraulic composition-soil mixture is lighter in weight and has better load distribution than rigid concrete or asphaltic road beds. Since the layers of subbases and also of the surface pavement can be constructed by mixing with the soil at the working site, the hydraulic composition-soil mixture has greater compatibility with each layer. Thus, in road construction, it is possible to have continuous road without requiring a joint. In contrast to asphalt-type pavement, the cured soils using the hydraulic composition of this invention are not melted under intense heat and its dimensional stability is excellent. Furthermore, the surface treatment of a sloping embankment can be readily accomplished using the hydraulic composition of this invention since the latter can be sprayed into the soil at the working site.

DESCRIPTION OF THE PREFERRED EMBODIMENTS

The hydraulic composition of this invention primarily comprises 100 parts by weight of a component A and 6 to 10 parts by weight of a component B. Component A is the product obtained by calcining a mixture of the following constituents: limestone—100 parts by weight; alumina—about 3 to about 6 parts by weight; silica—about 15 to about 30 parts by weight; magnesium oxide—about 4 to about 10 parts by weight; iron oxides—about 5 to about 10 parts by weight; and magnesium chloride—about 5 to about 10 parts by weight. This mixture is preferably calcined at a temperature between about 1,000° C. and about 1,300° C. and is thereafter rapidly cooled to a temperature below about 100° C. The calcined granules so produced are pulverized and mixed with component B having the following preferred composition: calcium sulfate—79 parts by weight; an alkaline earth metal chloride, e.g., calcium chloride—about 55 to about 75 parts by weight; an alkali metal silicofluoride—about 5 to about 10 parts by weight; an alkali metal carbonate—about 10 to about 20 parts by weight; a buffering agent, e.g., sodium tripolyphosphate—about 10 to about 20 parts by weight; lignin sulfonate—about 30 to about 50 parts by weight.

Components A and B are mixed together to produce the hydraulic composition of this invention in the aforementioned ratio. This mixture is mixed with soil in varying ratios depending upon the use to which the resulting product is to be put. The soil-hydraulic composition mixture is normally packed, watered and allowed to harden. A further improvement in the product may be obtained by the addition of a component C (described hereafter) to the component A-B mixture.

The constituents of components A and B will now be more specifically described, beginning with the constituents of component A. In addition to limestone, which is the primary constituent of component A, the latter contains both alumina and silica, both of which help to solidify and increase the strength of the soil-hydraulic composition mixture. The alumina and silica may be employed in component A as separate constituents, or they may be employed in combined form, e.g., as an alumino-silicate shale or clay such as Kaolin. The use of a shale to provide both the alumina and silica is generally preferred for economic reasons. However, if the soil which is to be strengthened is a sandy soil, it is preferable to employ silica itself rather than silica in a form such as a shale.

Magnesium oxide is employed in component A to help in the reaction between the alumina and silica and the soil. It may also be introduced separately as magnesium oxide or it may be introduced in combined form such as serpentine (3MgO·SiO₂·2H₂O). The latter is preferred because of its low cost. However, if serpentine is employed, its silica content must be taken into account when determining the amount of silica to be included in component A.

Iron oxide is employed in component A to prevent cracking of the hydraulic composition-soil product during hardening of the latter. It is also employed because it is a good heat conductor and thereby serves to relieve and reduce stresses in the product composition due to temperature differences. Iron oxide, as that term is employed herein, includes the various oxides of iron such as, for example, $FeO$, $Fe_2O_3$ and $Fe_3O_4$.

An alkaline earth metal chloride is employed herein to help solidify the hydraulic composition-soil product and to aid in binding the hydraulic composition and soil together. Magnesium chloride is preferred because of its availability and because of its low cost.

The constituents of component A are thoroughly mixed and preferably formed into granules having a grain size of about 1 to 3 centimeters in diameter. However, this mass may also take the form of a powder or pulverized mass. This mixture is then calcined. The calcination is preferably carried out in a kiln with smokeless coke or other suitable carbon source. The calcination temperature is preferably in the range from about 1,000° to about 1,300° C. Upon completion of the calcination, e.g., in about 1 hour, the calcined material is quickly cooled to about 100° C. or below. Rapid cooling of the calcined material to a temperature of 100° C. or less is necessary to produce the improved hydraulic composition of this invention. Such a rapid cooling greatly improves the interaction of the hydraulic composition of this invention with the soil to which it is added. The term "rapid cooling" is herein employed to mean cooling of the calcined mixture from the calcination temperature range to 100° C. or less in about 30 minutes to about 90 minutes. Rapid cooling of the calcined mixture may be accomplished by passing cold air through the calcined mixture.

The calcined mixture, particularly if in granular form, is preferably broken down to a mesh size of less than 100 mesh and preferably to a size below about 200 mesh. A preferred form of component A is a powder of which not less than 90 percent by weight has a mesh size between 200 mesh and 5,000 mesh.

Component B contains calcium sulfate to retard the hardening of the hydraulic composition-soil mixture to permit sufficient time for mixing and working this mixture. The calcium sulphate is preferably used in its hydrated form known as gypsum.

An alkali metal silicofluoride, e.g., sodium silicofluoride, is employed in component B to speed up the curing or hardening of the hydraulic composition-soil mixture. It thus acts to partially offset the retarding action of the calcium sulfate. If the latter is used in the absence of an alkali metal silicofluoride, the resulting soil stabilizing compound would harden relatively slowly, e.g., in about 3.5 hours as compared with a hardening or curing time of about 1.2 hours when an alkali metal silicofluoride is included in component B.

Lignin sulfonate is employed in component B to serve as a binder. An alkaline earth metal chloride, e.g., calcium chloride, is employed to aid in the compacting of the hydraulic composition-soil mixture.

An alkali metal carbonate, e.g., sodium carbonate is employed in component B to provide the hydraulic composition of this invention with a pH of about 7 or greater. Acid pH's are to be avoided because they can cause fermentation of the soil. Because of the difficulty of controlling the pH of the hydraulic compositions using an alkalizing agent, e.g., sodium carbonate, alone, a buffering agent is also included in component B. Various buffering agents compatible with the components of this hydraulic composition and well known to those skilled in the art may be employed. An example of a highly useful buffering agent is sodium tripolyphosphate.

The particular amounts of each of the constituents of components A and B are quite important in producing the advantageous results obtainable using the hydraulic composition of this invention. If the constituents of the hydraulic composition of this invention are employed in amounts above or below the ranges previously set forth for these constituents, the resulting hydraulic composition differs substantially from the hydraulic composition produced by using the constituents in amounts within the concentration ranges previously described. This will be more specifically illustrated by the examples included herewith.

The constituents of component B are mixed together and are preferably reduced to the same grain size as that of component A. Components A and B are intermixed by mixing about 6 to about 10 parts by weight of component B with 100 parts by weight of component A to produce the hydraulic composition of this invention. Outside this concentration range of component B to component A, the improved hydraulic composition of this invention is not produced.

The aforedescribed hydraulic composition containing components A and B may be further improved by combining therewith a component C having the following composition: 100 parts by weight of at least one member selected from the group consisting of weathered granite soil calcined at 700° to 900° C., decomposed basalt soil calcined at 300° to 500° C., and volcanic ashes or decomposed andesite soil calcined at 300° to 500° C.; and 40 to 60 parts by weight of at least one member selected from the group consisting of sand or pozzolan gravel calcined at 200° to 300° C., limestone residue which comprises overheated calcined residue which is not returned to slaked lime in the presence of water, calcined at 200° to 300° C., calcium hydroxide calcined at 200° to 300° C., nickel blast furnace slag calcined at 200° C. to 300° C., and the residue of electrolytic refining of aluminum calcined at 200° to 300° C.

Component C is preferably employed in the range of about 10 parts to about 20 parts by weight per 100 parts by weight of component A. Preferably, component C is employed in the form of a powder having a mesh size similar to that of component A.

In use, the hydraulic composition of this invention is intermixed with soil, rolled, watered, and allowed to stand until the resulting hydraulic composition-soil mixture hardens. The ratio of the hydraulic composition to the soil with which it is mixed depends upon the use to which the resulting hardened product is to be put. For example, a roadbed is produced by combining the hydraulic composition of this invention with soil at the working site to produce a hydraulic composition-soil mixture containing about 7 to about 50 percent by weight and preferably about 10 to about 30 percent by weight of this hydraulic composition.

The amount of water added to the hydraulic composition-soil mixture depends upon the particular soil with which the hydraulic composition is to be mixed. That is, it depends upon the characteristics of the soil itself and upon the water content of the soil. In general, it is preferred to employ water in amounts between about 30 and about 40 percent of the combined weight (dry) of the hydraulic composition and soil, although greater or lesser amounts may be successfully employed.

The roadbed formed after watering and rolling this mixture can be used as a simple pavement for secondary roads or paths, or it may be paved with a concrete or asphalt layer to produce a major highway. Such a roadbed formed from the combination of soil and the hydraulic composition of this invention has a resiliency intermediate that of rigid roadbeds formed from concrete and flexible roadbeds formed from asphaltic mixes, is lighter in weight and more compatible with the underlaying of the roadbed than is rigid roadbed, and can be formed continuously without requiring a joint.

The hydraulic composition of this invention will be more specifically described by the following examples:

In the following examples, cured products were made up comprising 20 parts by weight of a hardening or setting agent and 80 parts by weight of Kanto loam. The hardening agents employed in each example had the compositions shown hereafter. The hardening agent-Kanto loam mixtures were hardened by equally pounding each mixture and by adding 15 percent by weight of water to the total weight of the mixture to each mixture. The resulting cured products were subjected to various tests (compression, bending, setting, dimensional stability, weathering and abrasion tests). The procedure employed in carrying out these tests will first be described.

The compression, bending and setting tests were conducted in accordance with JIS-R5201 (a Japanese physical property testing method for cements).

The dimensional stability was performed by two methods. In a first method, cubic specimens (about 30 cm. × 30 cm. × 30 cm.) were formed and their original dimensions were measured. After standing at room temperature for 1 week, their dimensions were again measured. Comparison of the latter dimensions with the original dimensions of each specimen indicated the percentage contraction or expansion. In a second method, planar specimens (about 3 cm. × 30 cm. × 30 cm.) were formed. Each specimen was placed horizontally in a testing chamber with a sight window and subjected to repeated heating-cooling cycles consisting of 1 hour at −20° C. followed by 1 hour at 40° C. In each case, the number of cycles required to produce cracking of the specimens was noted.

For the weathering test, specimens having the dimensions of 10 cm. × 50 cm. × 50 cm. were prepared. Each specimen was allowed to stand outdoors for 3 months. At the end of this period, a steel ball (15 cm. in diameter) was dropped from a height of 2 meters onto each specimen with each specimen placed horizontally over an iron support plate. The degree of weathering was determined using the following grading: 1st grade—from no observed change to a depression with a slight crack at the point of impact; 2nd grade—from a depression with a slight crack at the point of impact and at its periphery to the condition in which cracks are observable within a 20 cm circle from the point of impact; 3rd grade—condition in which the specimen is indented and crumbled into pieces at the point of impact; 4th grade—the condition in which the specimen is crumbled at the point of impact and in the adjacent peripheral area and in which fragments are scattered by the impact; and the 5th grade in which the specimen crumbles within a 20 cm. circle from the point of impact and fragments are scattered by the impact. Weathering degrees of the third, fourth and fifth grades were deemed unsatisfactory.

The abrasion test was carried out by first preparing test specimens 1 meter in width and length. A truck tire was rotatably mounted on a vertically movable shaft which was urged downwardly by springs provided on both sides of the tire in engagement with the shaft through a bearing. The test piece was securely fitted in a fixed frame on an iron plate and the tire was driven at the rate of 410 revolutions per minute while being held in pressure contact with the upper surface of the test piece. The result of the abrasion test was indicated by the time before the portion of the test piece in contact with the tire had been completely worn off. Low times indicate poor abrasion resistance.

The following hydraulic soil-setting and hardening compositions were prepared

|  | Parts by weight | | |
|---|---|---|---|
|  | Ex. 1 | Ex. 2 | Ex. 3 |
| Limestone | 100 | 100 | 100 |
| Shale (70% silica; 18% alumina) | 28 | 25 | 19 |
| Serpentine (44% MgO; 44% silica) | 18 | 15 | 12 |
| Iron oxide | 9 | 8 | 6 |
| Magnesium chloride | 9 | 7 | 6 |
| Gypsum (79% calcium sulphate) | 100 | 100 | 100 |
| Calcium chloride | 70 | 65 | 60 |
| Dried lignin pulp waste solution | 45 | 40 | 32 |
| Sodium silico-fluoride | 9 | 8 | 6 |
| Soda ash | 18 | 15 | 12 |
| Sodium tripolyphosphate | 18 | 15 | 12 |
| Parts by weight of A | 100 | 100 | 100 |
| Parts by weight of B | 7 | 8 | 9 |

The constituents of component A were mixed, calcined at a temperature of about 1,000° to about 1,300° C., reduced to a powder of 200 to 500 mesh. The constituents of component B were intermixed and reduced to a powder having substantially the same mesh size as component A. Components A and B were then intermixed in the above-indicated ratios. The resulting hydraulic composition was mixed with Kanto loam in the ratio of 20 parts by weight of the hydraulic composition to 80 parts by weight of Kanto loam as previously described. For comparison purposes, hydraulic compositions were prepared in the same manner, except that the constituents and the amounts of the constituents were varied so as not to meet the requirements for the hydraulic composition of this invention. The variations in the constituents and the amounts thereof of these comparison samples is set forth in Table 1 below. The results of all the tests performed on the hydraulic compositions of this invention, as well as on the comparison test specimens, are also summarized in Table 1.

No test data has been supplied for the comparison samples which did not comprise limestone or gypsum (calcium sulfate) since test specimens could not be made in the absence of these constituents.

| Sample | Compressive strength (kg./cm.²) | Bending strength (kg./cm.²) | Setting test (hr.) | | Dimensional (percent change) | Stability (cycles) | Weathering (grade) | Abrasion resist. (hr.) |
|---|---|---|---|---|---|---|---|---|
|  |  |  | Start | Finish |  |  |  |  |
| Example 1 | 200 | 32 | 1.10 | 6.00 | 0.04 | 20 | 1 | 100 |
| Example 2 | 192 | 30 | 1.30 | 7.00 | 0.06 | 18 | 1 | 98 |
| Example 3 | 185 | 28 | 1.50 | 8.00 | 0.08 | 16 | 1 | 95 |
| Example 4 (Same as Ex. 1, except that the sample is composed of 100 parts by weight of A and 4 parts by weight of B) | 120 | 20 | 3.20 | 24.00 | 0.1 | 7 | 3 | 8 |
| Example 5 (same sample as Ex. 3, except that the sample is composed of 100 parts by weight of A and 12 parts by weight of B) | 230 | 15 | 0.30 | 2.00 | 0.8 | 1 | 5 | 3.10 |
| Example 6 (same sample as Ex. 2, except that shale is omitted) | 120 | 15 | 1.20 | 6.00 | 0.9 | 5 | 3 | 2.10 |
| Example 7 (same sample as Ex. 2, except that serpentine is omitted) | 100 | 10 | 1.20 | 6.0 | 0.9 | 5 | 3 | 3.20 |
| Example 8 (same sample as Ex. 2, except that iron oxide and lignin sulfonate are omitted) | 50 | 5 | 2.00 | 12.00 | 0.7 | 3 | 4 | 1.50 |
| Example 9 (same sample as Ex. 2, except that magnesium chloride and soda ash are omitted) | 70 | 7 | 3.20 | 30.00 | 0.5 | 8 | 4 | 2.10 |
| Example 10 (same sample as Ex. 2, except that calcium chloride is omitted) | 75 | 7.5 | 3.00 | 25.00 | 0.6 | 8 | 4 | 2.00 |
| Example 11 (same sample as Ex. 2, except that sodium tripolyphosphate is omitted) | 70 | 7 | 2.30 | 24.00 | 0.8 | 7 | 5 | 2.50 |
| Example 12 (same sample as Ex. 2, except that sodium silicofluoride is omitted) | 65 | 6.5 | 3.30 | 24.00 | 0.4 | 7 | 3 | 3.00 |
| Example 13 (same sample as Ex. 2, except that soda ash is omitted) | 70 | 7 | 3.30 | 31.00 | 0.4 | 7 | 3 | 2.50 |
| Example 14 (same sample as Ex. 2, except that the amount of shale is "5 parts by weight) | 150 | 17 | 1.20 | 7.00 | 0.09 | 12 | 2 | 70 |
| Example 15 (same sample as Ex. 2, except that the amount of shale is 10 parts by weight) | 120 | 10 | 1.40 | 8.00 | 0.1 | 10 | 3 | 65 |
| Example 16 (same sample as Ex. 2, except that the amount of serpentine is 25 parts of the weight) | 150 | 17 | 1.40 | 8.00 | 0.09 | 12 | 2 | 75 |
| Example 17 (same sample as Ex. 2, except that the amount of serpentine is 5 parts by weight) | 110 | 9 | 2.10 | 10.00 | 0.2 | 10 | 3 | 66 |
| Example 18 (same sample as Ex. 2, except that the amount of iron oxide is 3 parts by weight and the amount of magnesium chloride is 15 parts by weight) | 130 | 15 | 1.10 | 6.00 | 0.7 | 13 | 2 | 76 |

| Sample | Compressive strength (kg./cm.²) | Bending strength (kg./cm.²) | Setting test (hr.) Start | Setting test (hr.) Finish | Dimensional (percent change) ¹ | Stability (cycles) | Weathering (grade) | Abrasion resist. (hr.) |
|---|---|---|---|---|---|---|---|---|
| Example 19 (same sample as Ex. 2, except that the amount of calcium chloride is 45 parts by weight) | 120 | 14 | 1.00 | 15.00 | 0.5 | 10 | 3 | 62 |
| Example 20 (same sample as Ex. 2, except that the amount of calcium chloride is 85 parts by weight) | 140 | 15 | 0.50 | 4.00 | 0.8 | 10 | 3 | 60 |
| Example 21 (same sample as Ex. 2, except that the amount of lignin sulfonate is 20 parts by weight and the amount of soda ash is 25 parts by weight) | 100 | 10 | 1.8 | 24.00 | 0.08 | 14 | 2 | 40 |
| Example 22 (same sample as Ex. 2, except that the amount of lignin sulfonate is 60 parts by weight and the amount of soda ash is — parts by weight) | 120 | 15 | 2.5 | 40.00 | 0.04 | 16 | 1 | 75 |
| Example 23 (same sample as Ex. 2, except that the amount of sodium silico-fluoride is 3 parts by weight and the amount of sodium tripoly-phosphate is 25 parts by weight) | 80 | 7 | 2.7 | 42.00 | 0.04 | 15 | 1 | 65 |
| Example 24 (same sample as Ex. 2, except that the amount of sodium silico-fluoride is 15 parts by weight and the amount of sodium tripoly-phosphate is 5 parts by weight) | 120 | 15 | 0.7 | 5.00 | 0.9 | 5 | 3 | 7 |

¹ After 1 wk. at room temp.

As previously mentioned, Examples 1, 2 and 3 involve the use of hydraulic compositions which are the subject of this invention. By comparison, the compositions of Examples 4 and 5 are identical except that the hydraulic compositions employed therein contain 4 and 12 parts of component B/100 parts by weight of component A rather than the 6 to 10 parts by weight of component B/100 parts by weight of component A of the hydraulic compositions of this invention. As shown in Table 1, the hydraulic compositions of Examples 4 and 5 produce cured soils which are markedly inferior to the soils cured using the herein-described hydraulic compositions (represented by Examples 1, 2 and 3). For example, in comparison to the soils of Examples 1, 2 and 3, the soil of Example 4 has a substantially lower compression strength (120 kg./cm.² as compared to 185-200 kg./cm.²), bending strength (20 kg./cm² as compared to 28-32 kg./cm.²), crack resistance to temperature cycling (7 cycles as compared to 16-20 cycles), and abrasion resistance (8 hours as compared to 95-100 hours). Additionally, the soil of Example 4 requires a longer time to set and exhibits poor weathering ability as compared to the soils of Examples 1, 2 and 3.

The cured soils of Examples 6-13 were prepared by using hydraulic compositions which were the same as the hydraulic composition employed in Example 2 except that one or more constituents were eliminated from the latter to make the former, as shown in Table 1. Table 1 shows that the absence of each of the eliminated constituents has a highly adverse effect on the properties of the cured soils. In each instance, the cured soils of Examples 6-13 exhibited substantially lower compressive and bending strengths, crack resistance, and poor dimensional stability as compared with the cured soil of Example 2. Thus, from a comparison of Example 2 with Examples 6-13, it is evident that each of the eliminated constituents (Examples 6-13) is necessary to produce the desirable characteristics of the soils cured with the herein-described hydraulic composition.

Examples 14 and 15 illustrate the effect of using higher and lower amounts, respectively, of silica and alumina than is called for in this invention (15 to 30 parts of silica; 3 to 6 parts of alumina). Variation of the amounts of alumina and silica was accomplished by varying the amount of shale. The hydraulic composition of Example 14 contained 31.1 parts by weight of silica and 6.3 parts by weight of alumina whereas the hydraulic composition of Example 15 contained only 13.6 parts by weight of silica and 1.8 parts by weight of alumina. From Table 1, it will be seen that the cured soils of Example 14 and, particularly Example 15, exhibit significantly lower strength than the soils cured by the hydraulic composition of this invention (Examples 1, 2 and 3). Thus, Examples 14 and 15, when compared with Examples 1-3, show that use of amounts of silica and alumina both above and below the previously described ranges for these constituents cause a marked decrease in the strength of soils cured by hydraulic compositions containing such increased and decreased amounts of silica and alumina.

Examples 16 and 17 illustrate the effect of employing amounts of magnesium oxide in excess of and less than the 4 to 10 parts by weight/100 parts by weight of limestone employed in the herein-described invention. Variation of the amount of magnesium oxide was accomplished by varying the amount of serpentine which also changes the amount of silica but the latter remains within the range employed herein. The hydraulic compositions used in Examples 16 and 17 contain 11.0 parts (28.5 parts of silica) and 2.2 parts (19.7 parts of silica) by weight of magnesium oxide, respectively. The soils cured by these hydraulic compositions are significantly weaker than those cured by the hydraulic compositions of this invention as shown by Table 1.

A hydraulic composition was employed in Example 18 which contained a smaller amount of iron oxides and a greater amount of magnesium chloride than employed in the herein-described hydraulic composition. The effect of employing these amounts of iron oxides and magnesium chloride was to produce a cured soil which is substantially weaker than those soils cured using the herein-described compositions (Examples 1-3).

The hydraulic compositions employed in Examples 19 and 20 contain smaller (45 parts) and larger (85 parts) amounts of calcium chloride, respectively, than that employed in the hydraulic composition of this invention (55 to 75 parts by weight of calcium chloride/79 parts by weight of calcium sulfate). Again, Table 1 shows that the use of amounts of calcium chloride outside the range (55-75 parts) called for herein, results in cured soils having substantially poorer characteristics than soils cured by the herein-described compositions.

The hydraulic compositions employed in Examples 21 and 22 contain, respectively, a lower amount of lignin sulfonate and a higher amount of sodium carbonate, and a higher amount of lignin sulfonate and a lower amount of sodium carbonate, than are employed in the herein-described hydraulic composition. These amounts of lignin sulfonate and sodium carbonate also result in cured soils which are substantially weaker and longer curing than the same soils cured by the herein-described composition (Examples 1-3) as shown in Table 1.

The hydraulic compositions employed in Examples 23 and 24 contain a low and a high amount of sodium silicofluoride respectively, and contain a high and a low amount of sodium tripolyphosphate, respectively, as compared with the ranges for these constituents (5 to 10 parts of an alkali metal silicofluoride and 10 to 20 parts of a buffering agent per 79 parts by weight of calcium sulfate) employed in the herein-described hydraulic composition. The use of these amounts of these constituents also results in the production of cured soils having substantially lower strength and longer curing times than the same soils cured by the hydraulic composition of this invention (Examples 1-3).

The soils with which the hydraulic composition of this invention can be employed include gravels, sand, silt, clays, loam, and soils having a high organic content. In contrast to present cements, e.g., Portland cement, the hydraulic composition of this invention can be used to set soils having particle sizes of 0.001 mm. and smaller. Pouring of soil combined with the herein-described composition may be continuous. That is, no expansion joints are required as is the case with presently available cement compositions. Alternatively, pouring may be discontinued, e.g., because of the end of a work day, and may later be continued without forming an expansion joint, as presently required, because of the adhesive and low expansion characteristics of the hydraulic composition of this invention.

I claim:

1. A method for producing an hydraulic composition for setting soils, comprising:
   calcining an admixture consisting of
   100 parts by weight of limestone,
   about 3 to about 6 parts by weight of alumina,
   about 15 to about 30 parts by weight of silica,
   about 4 to about 10 parts by weight of magnesium oxide,
   about 5 to about 10 parts by weight of iron oxides,
   and about 5 to about 10 parts by weight of magnesium chloride;
   rapidly cooling said calcined admixture to a temperature below about 100° C. to produce a component A;
   admixing said component A with a component B consisting of
   79 parts by weight of calcium sulfate,
   about 55 to about 75 parts by weight of an alkaline earth metal chloride,
   about 5 to about 10 parts by weight of an alkali metal silicofluoride,
   about 10 to about 20 parts by weight of an alkali metal carbonate,
   about 10 to about 20 parts by weight of a buffering agent, and
   about 30 to about 50 parts by weight of lignin sulfonate,
   in a ratio of about 6 parts to about 10 parts by weight of component B to 100 parts by weight of component A.

2. The method of claim 1 wherein said alkaline earth metal chloride is a member of the group consisting of calcium chloride and magnesium chloride.

3. The method of claim 1 wherein said alkali metal silicofluoride is sodium silicofluoride.

4. The method of claim 1 wherein said alkali metal carbonate is sodium carbonate.

5. The method of claim 1 wherein said buffering agent is sodium tripolyphosphate.

6. The method of claim 1 wherein said admixture calcined to produce component A is calcined at a temperature between about 1,000° and about 1,300° C.

7. The method of claim 1 wherein said component A is worked until it has a mesh size less than about 100 mesh.

8. The method of claim 6 wherein said calcined admixture is cooled to a temperature below about 100° C. in about 30 minutes to about 90 minutes.

9. The method of claim 1, including the further steps of:
   admixing said hydraulic composition with soil in an amount between about 7 and about 50 percent by weight of the total soil-hydraulic composition admixture;
   wetting said soil-hydraulic composition admixture;
   and compacting said soil-hydraulic composition admixture, to thereby produce a hardened soil upon standing.

10. The method of claim 9 wherein the amount of moisture in said soil-hydraulic composition admixture after said wetting comprises between about 30 and about 40 percent of the dry weight of said admixture.

11. The method of claim 1 wherein said component A and said component B are admixed with a component C in a ratio of about 10 parts to about 20 parts by weight per 100 parts by weight of component A, said component C consisting of:
   100 parts by weight of at least one member selected from the group consisting of weathered granite soil calcined at 700° to 900° C., decomposed basalt soil calcined at 300° to 500° C., and volcanic ashes calcined at 300° to 500° C.;
   and 40 to 60 parts by weight of at least one member selected from the group consisting of pozzolan gravel calcined at 200° to 300° C., limestone residue which comprises overheated calcined residue which is not returned to slaked lime in the presence of water, calcined at 200° to 300° C., calcium hydroxide calcined at 200° to 300° C., nickel blast furnace slag calcined at 200° to 300° C., and the residue of electrolytic refining of aluminum calcined at 200° to 300° C.

12. A hydraulic composition according to the method of claim 1.

13. A hydraulic composition according to the method of claim 11.

14. A hardened soil according to the method of claim 9.

15. A method for producing an hydraulic composition for setting soils, comprising:
   calcining an admixture consisting of
   100 parts by weight of limestone,
   about 3 to about 6 parts by weight of alumina,
   about 15 to about 30 parts by weight of silica,
   about 4 to about 10 parts by weight of magnesium oxide,
   about 5 to about 10 parts by weight of iron oxides,
   and about 5 to about 10 parts by weight of magnesium chloride,
   at a temperature between about 1,000° and about 1,300° C.;
   rapidly cooling said calcined admixture to a temperature below about 100° C. in about 30 minutes to about 90 minutes to produce a component A;
   admixing said component A with a component B consisting of
   79 parts by weight of calcium sulfate,
   about 55 to about 75 parts by weight of an alkaline earth metal chloride,
   about 5 to about 10 parts by weight of an alkali metal silicofluoride,
   about 10 to about 20 parts by weight of an alkali metal carbonate,
   about 10 to about 20 parts by weight of a buffering agent, and
   about 30 to about 50 parts by weight of lignin sulfonate,
   in a ratio of about 6 parts to about 10 parts by weight of component B to 100 parts by weight of component A.

16. The method of claim 15, including the further steps of:
   admixing said hydraulic composition with soil in an amount between about 7 and about 50 percent by weight of the total soil-hydraulic composition admixture;
   wetting said soil-hydraulic composition admixture;
   and compacting said soil-hydraulic composition admixture, to thereby produce a hardened soil upon standing.

17. The method of claim 16 wherein the amount of moisture in said soil-hydraulic composition admixture after said wetting comprises between about 30 and about 40 percent of the dry weight of said admixture.

* * * * *